Nov. 11, 1969  P. N. ANDERSON  3,477,662
PNEUMATIC TUBE DEPLOYMENT MEANS, AND SOLAR CELL THEREWITH
Filed July 26, 1965  2 Sheets-Sheet 1
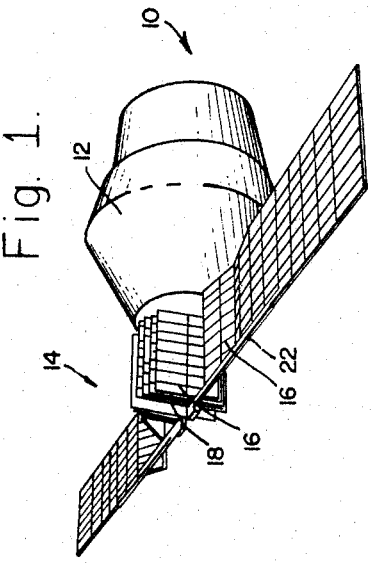
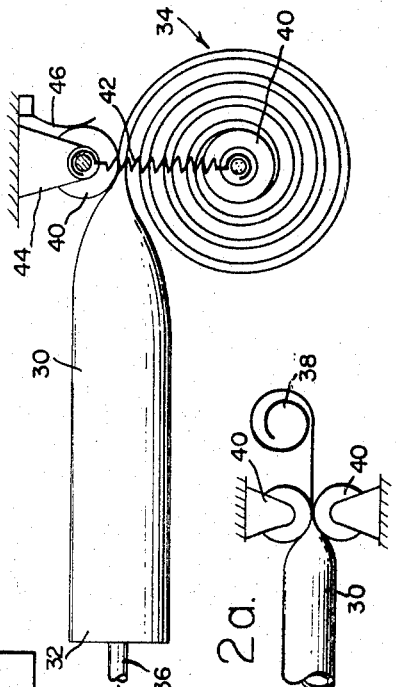
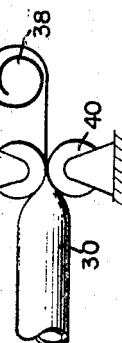
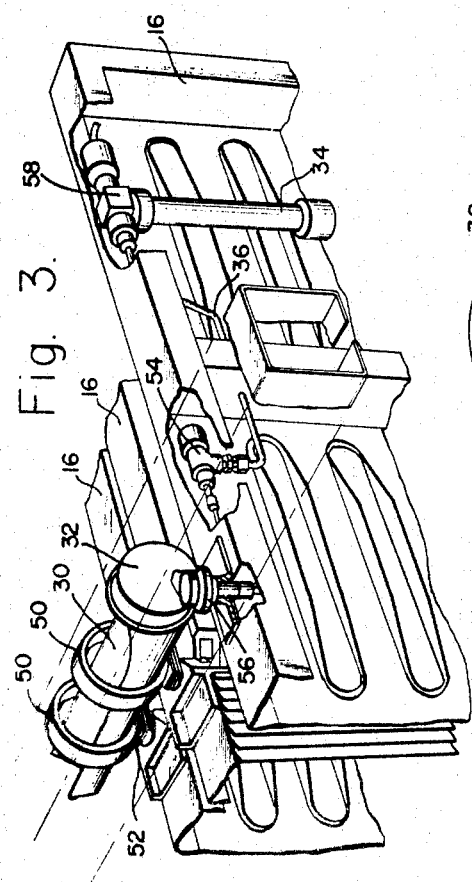
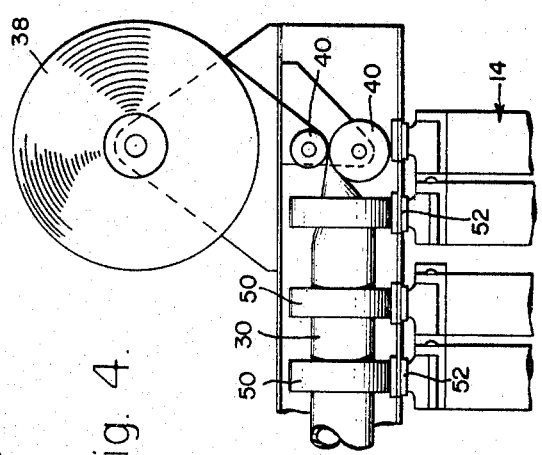
Philip N. Anderson,
INVENTOR.
BY
ATTORNEY.

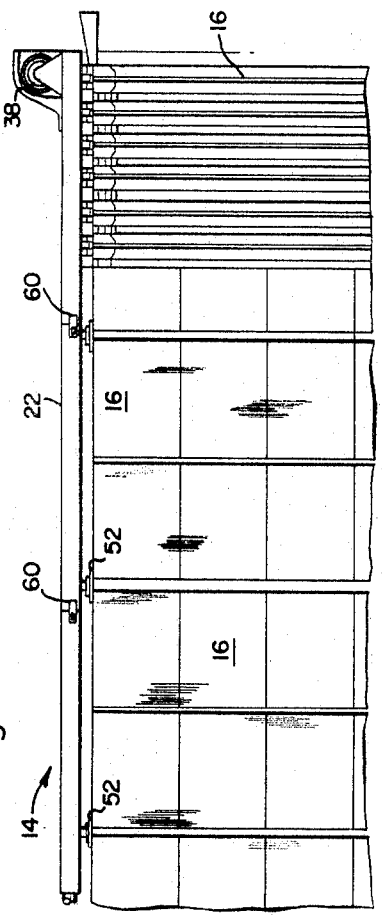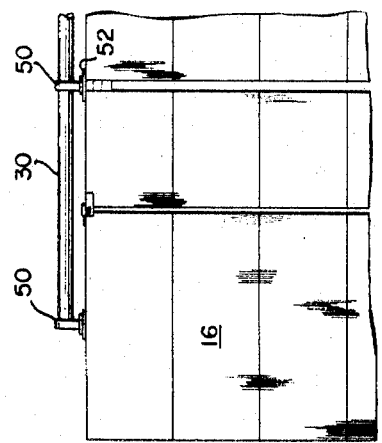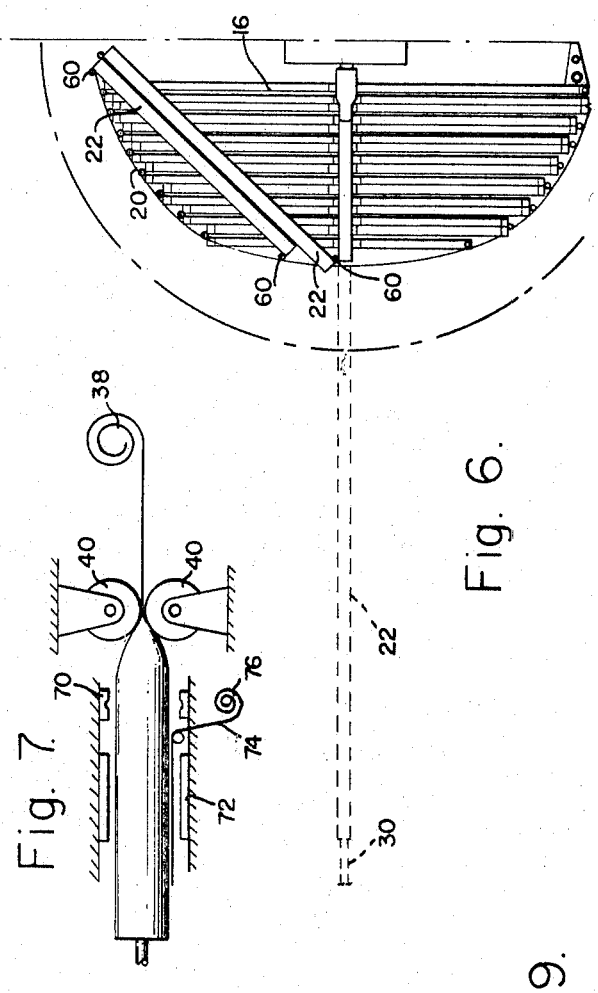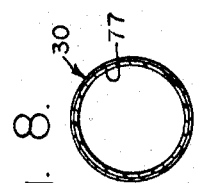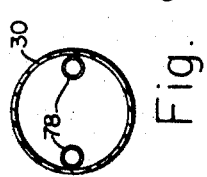

United States Patent Office 3,477,662
Patented Nov. 11, 1969

3,477,662
PNEUMATIC TUBE DEPLOYMENT MEANS, AND SOLAR CELL THEREWITH
Philip N. Anderson, Malibu, Calif., assignor to TRW Inc., Redondo Beach, Calif., a corporation of Ohio
Filed July 26, 1965, Ser. No. 474,928
Int. Cl. H01l 15/02
U.S. Cl. 244—1                                             19 Claims

ABSTRACT OF THE DISCLOSURE

A deployment mechanism having a relatively thin-walled flexible tube closed at one end and passing through a constriction means which compresses the tube laterally to form in the tube a flow inhibiting restriction, and pressurizing means for inflating the closed end portion of the tube to extend the tube longitudinally in the direction of its closed end. A deployable assembly having normally retracted deployable means, such as an array of articulated solar panels for a spacecraft, and utilizing the tube deployment mechanism for extending the deployable means from its retracted position to an extended position.

This invention relates, in general, to devices for supplying motive power to devices which require force over long distances in order to be actuated, and relates, in particular, to devices for supplying motive power for deploying long booms, solar array or other mechanical devices in spacecraft.

The use of long booms for space vehicles to provide stabilization of the vehicle, or for antennas, or for solar array is, of course, well known but prior to this invention there has been a need for a lightweight reliable means for providing ample motive power for extending such booms which could easily be controlled in terms of rate of deployment. Mechanical systems utilizing springs have been used but these were deficient because the springs were extremely heavy for the amount of power available and the rate of deployment of the boom was not easily controlled.

Another problem which exists is one of storage of such prior art devices prior to extension of the boom in as little a space as possible. Most mechanical devices could not cope with this storage problem although the use of long, split, overlapping tubular material which may be spread flat and rolled onto a storage drum is a step toward the solution thereof. This latter device, however, is heavy, the rate of deployment is not easily controlled, and is limited in its power capability.

Thus, it is a principal object of this invention to provide a device which solves the problems of inadequate motive power, weight, controllability and storage inherent in the prior art devices. This object is accomplished by the concept of placing an inflatable tube in a restriction and pressurizing the tube on one side of the restriction, so that as the tube tends to assume its inflated tubular configuration, the tube is pulled through the restriction thus utilizing the pressure forces within the tube itself to deploy or extend a boom. More specifically, this deployment device comprises a flexible tubing of suitable length rolled on a reel or stored in a container with part of the tube near one end restricted by a suitable device, such as a pair of rollers. A source of pressure is connected to the end of the tube on the side of the restriction opposite the reel and when the pressure is released to enter the tube, the tubing is pulled by the pressure acting on the walls of the tube through the restriction and off the storage reel. Means may be provided for controlling the deployment of this tube such as a braking device for restricting the rotation of the rollers, thus controlling the unwinding of the tube from the reel. Finally, in connection with this invention, still another refinement is embodied in the restriction itself. In this latter and preferred embodiment, one of the rollers forming the restriction can be used as a storage reel which, of course, reduces still further the storage space required for this invention, thus increasing its usefulness in a space vehicle.

This invention has many and varied applications, and to demonstrate this, this deployment tube is shown as a means for positioning an array of solar energy conversion devices into the operative position on a space vehicle from their initial collapsed position at the time of launching, and in another application, the boom is used with reinforcing material to make the boom suitable to use as an antenna. This application will also be described in more detail. The invention also teaches a means of utilizing a thermal setting or other resin which would provide the boom with a permanent set as it is being unrolled from the reel, and in still another refinement of the invention there is the provision of a metallized covering for the boom for added strength or for antenna purposes.

It shall be noted at this point, in further connection with prior art devices, that while the concept of inflating a plastic bag on one side of a restriction has been utilized in the high altitude balloon art, the purpose of the restriction was simply to locate the gas to insure that the initial inflation of the bag was located at the end of the bag which was to become the upper or top of the balloon. Absent the restriction, the initial insertion of the gas could have been located just as easily at the bottom or the mid-portion of the balloon, making the entire system awkward and hard to handle. Another purpose of this restriction in the balloon art was to enable the users to attach the necessary accessories as soon as the end portion, or top portion, became inflated, and this restriction also provided a means of controlling the size of the balloon during inflation to overcome the problems that the wind would cause during launching. Once the initial inflation and proper location of the gas was located, the lifting force of the gas simply pulled the side walls through the restriction to expend the remainder of the balloon. This differs from the present invention in that the gas pressure is utilized throughout the entire length of the boom to react against the restriction to provide the motive power for extending the boom to its final configuration.

Accordingly, still another and more specific object of this invention is to provide a boom for space satellite use which is extendable throughout its entire length by gas pressure reacting against a restriction so that the gas pressure becomes the motivating power to deploy the boom from its stored position.

Other additional advantages and features of this invention will become apparent to those skilled in the art after reading and understanding the following specification and drawings which form a part thereof and wherein:

FIGURE 1 is a perspective view of a satellite vehicle incorporating the present invention;

FIGURE 2 and 2a are schematic illustrations of the basic concept of the invention as it is utilized in the satellite vehicle;

FIGURE 3 is a perspective view of the outer end panels of the solar array such as illustrated in FIG. 1 but enlarged to show the details of construction;

FIGURE 4 is an enlarged detail view of the inner end panels of the array such as illustrated in FIG. 1 but enlarged to show the details of construction;

FIGURE 5 is an enlarged plan view illustrating the invention incorporated in the satellite vehicle of FIG. 1 with the boom partially extended;

FIGURE 6 is an end view showing the solar array in stored position prior to deployment such as shown in FIG. 5;

FIGURE 7 is a schematic illustration of another embodiment of the invention; and FIGURES 8 and 9 are cross-sectional views of various configurations of the deployable boom.

Referring now more particularly to the drawings, FIG. 1 illustrates a space vehicle 10 in which the invention may be incorporated and illustrated herein as a typical application of the invention. This space vehicle comprises a conventional body portion 12 having a solar energy conversion system indicated in its entirety as 14 and which comprises a plurality of solar panels 16. Each solar panel 16 conventionally comprises a plurality of solar cells capable of converting solar energy into electrical energy to form a power supply for the various instruments and devices in the space vehicle. FIGS. 1 and 5, on the other hand, illustrate the solar array 14 partially extended to illustrate both the panels in their flattened operative position as well as in their stowed launching position, but during launching, panels 16 are stowed or confined preferably in as small a storage area as possible which in this embodiment is in folded or retracted relations as shown in FIG. 6. It can be appreciated, of course, during launching, suitable retention means such as cables 20, will bind the folded panels in their launching, or folded, position and suitable release mechanisms will be provided to render the retention means inoperative when it is desired to extend or deploy the solar panels. The solar array 14 is also provided with tracks 22, shown in extended position in FIG. 1, which serve to aid in directing the deployment of the panels toward their operative position. During launching, these tracks, being in segments, are folded and retained in such a position by the same retention means which holds the panels in their folded position as shown in FIG. 6.

As hereinabove mentioned, this invention provides a light and reliable means for supplying motive power for extending long booms, solar arays and other mechanical devices, and is utilized in this embodiment to deploy the solar array 14, but before describing in detail the application of the invention to deploy the solar array, attention is first directed to FIGS. 2 and 2a, a schematic illustration of the invention, in order to understand its working principle. The motive power device comprises a deployable tubing 30 of a plastic or other flexible material which passes between a pair of fixed rollers 40. These rollers compress the tube laterally to form in the tube a restriction which blocks fluid flow through the tube from one side of the restriction to the other. The tube 30 is closed at one end 32 and connected to a pressure source 34 in any suitable manner, as by tubing 36. The other end portion of the deployable tubing 30 constitutes a stowage end portion which is stored in a minimum volume configuration within a relatively fixed tube stowage region in the space vehicle so as to provide a fixed tube reservoir portion or tube store within the region. For example, the stowage end portion of the tube, in its stored configuration, may be wrapped around a separate reel 38 as shown in FIG. 4 or wrapped around one of the rollers 40 as shown in FIG. 2. In this latter embodiment, rollers 40 are biased towards one another by spring 42 so as to continually form a restriction of the same size as the reel is unwound, thereby continually restricting the tube 30 as fluid under pressure is introduced into one end of the tubing, as illustrated in this figure. Rollers 40 are, of course, suitably mounted in a conventional manner on suitable bearings and bearing mounts 44 attached to the body 12, to provide a proper attachment to the vehicle body 12. Rollers 40 are also provided, if found to be necessary, with a speed control device of any suitable type such as a spring 46 which frictionally engages at least one roller to prevent the tubing 30 from unwinding too fast. A speed dependent brake of the viscous fluid type may also be utilized.

Thus, pressure fluid entering end 32 pressurizes the deployment tube 30 which causes it to assume its cylindrical configuration. This motion is opposed by the restriction and inasmuch as the tube is not pressurized on the side of the rollers opposite the pressure source 34, there is a net force which tries to pull the tube through the restriction. More specifically, this net force caused by the pressure in the tube expanding the side walls of their desired cylindrical configuration and reacting against the restriction, form the motive power for moving the end wall 32 in a direction away from the restriction and thus unwind the tubing from the reel. It can be appreciated that once having understood the operative principle of this invention, many uses are suggested such as, for example, as mentioned above, the deployment of an antenna or a solar array, the latter of which will now be described in detail.

Turning now in particular to FIGS. 3-6, it can be seen that in FIG. 3 the deployment tube 30 is shown cradled in tube guides 50 (two shown in this figure) which are hingedly connected to solar panels 16. The rotational movement permitted by this hinge connection 52 between the solar panels 16 permit the latter to move relative to the deployment tube 30 and tube guides 50, and the latter permit relative movement between the tube 30 and the panels 16 as the deployment tube is being inflated and moved outwardly in accordance with the principles described in connection with FIGS. 2 and 2a.

End 32 of the deployment tube 30 is hingedly connected to the end panel 16 so that movement of the end 32 by the inflation of the deployment tube 30 serves to extend the end panel 16 which, in turn, pulls the remainder of the panels 16 from their stored position, as previously mentioned and as depicted in FIGS. 1, 5 and 6. The segments of track 22 are also unfolded and deployed by springs (not shown) in advance of the deployment of tube 30 to form a guide for the tube guides 50 at least part of the way of array travel.

To cause inflation of the deployment tube 30, the pressure source 34 in the form of a tank assembly mounted on end panel 16 is connected to the deployment tube 30 through the tubing 36 by way of a pressure regulator valve 54 and a swivel fitting 56. Thus, upon a signal from the main satellite portion 12, a solenoid-actuated valve 58 will release the pressure in the tank assembly to introduce fluid under pressure into the deployment tube 30 to begin pressurization of the tube. Again, inasmuch as the end panel 16 is permanently connected to the end 32 of the deployment tube 30 as the deployment tube pressurizes and reacts against the restriction, the end panel will be caused to move outwardly away from the main satellite portion (as viewed in FIG. 1) along the track 22 which has already been unfolded at its hinged connections 60 through the operation of springs (not shown).

Turning now particularly to FIGS. 4 and 5, it can be seen that the deployment tube 30 is restricted by the aforementioned rollers 40 and wound around reel 38. These latter are, of course, mounted permanently affixed to the space vehicle and which in this embodiment is on the end segment of the track 22. The last or inner panel 16 is fixedly connected to the end segment of the track so that it will remain immovable relative to spacecraft, thus fixing the maximum extension of the solar array.

It should be noted that while the showing in FIG. 4 shows the reel separate and apart from the restrictive rollers 40, one of these rollers could be formed into the reel in accordance with the teachings of FIG. 2, as, for example, the upper roller 40 could be made to be the roller upon which the tubing is rolled and spring-biased towards one another to form the proper restriction and to compensate for the reduction in size of the upper roller as the tubing is being deployed.

From the foregoing it can be seen that this motive power means comprising this invention has one practical application in the deployment of the solar panel array.

As hereinabove mentioned, this invention has many applications once the principles thereof are understood, an example of such applications being illustrated in FIG. 7. In this figure, it can be seen that deployment tube 30 after passing through the restrictive rollers 40 may be coated by any suitable device 70 such as a spray or a brushing technique, with a resin or any suitable coating and heated by the heaters 72 if the latter is necessary. This figure also shows a manner of attaching wires, cables or other reinforcing 74 fed from reel 76 onto the tubing 30 after the latter leaves the restriction. Of course, wires 74, etc., can be bonded to the tubing 30 either by an adhesive which is on the reinforcing or may be bonded by the apparatus shown in this figure. This figure also shows how the heaters 72 could be used to harden a resin such as a thermosetting resin either as a coating or as the walls of the deployment tubing itself to give rigidity and strength to the boom.

FIG. 8 shows examples of combinations of materials such as aluminum 77 coated, as by depositing, on the tubing 30 which would give the tubing rigidity and strength and also serve as an antenna if the same is desired. There are a number of combinations or layers of metallic coatings and plastic or other materials that may be used, for example it may be desirable to have the metal on the inside and the plastic on the outside, or the metal sandwiched between plastic, or plastic between sheets of metal, etc., depending on the requirements for this deployment device.

FIG. 9 also shows the incorporation of smaller tubes 78 and attached to the inner side walls of the larger tube 30 to change the cross-sectional configuration of the tube where this is desired. This inner tubing 78 could be pressurized at the same time the larger tubing 30 is pressurized so as to give the outer tubing 30 additional strength and form the latter into a noncircular cylindrical configuration if desired.

While the above tubing 30 has been described as plastic, the same could be of any plastic impregnated cloth, or suitable flexible material, which can be rolled, and the tubes need not necessarily be of a constant diameter or thickness in order to perform the function required. Too, while the end 32 is described as moving away from the restriction it may be desirable in some applications to have the pressure source 34 and end 32 fixed and move the restriction which, of course, is within the scope of this invention.

The embodiments of the invention in which an exclusive property or privilege is claimed are defined as follows:

1. A deployment mechanism comprising:
    a long relatively thin-walled flexible tube closed at one end and having a generally uniform cross-section throughout substantially its entire length;
    relatively fixed constricting means engaging and laterally compressing said tube locally for creating a restriction in said tube wherein opposing wall portions of said tube are disposed in substantially fluid sealing relation so as to inhibit fluid flow through the central tube passage from one side of the restriction to the other, said tube having a closed end portion at one side of said restriction and an opposite stowage end portion which is stored in a minimum volume configuration within a relatively fixed tube stowage region at the other side of said restriction so as to provide a relatively positionally fixed tube store within said region;
    said tube being movable longitudinally through said constricting means, and means for deploying said tube relative to said constricting means by longitudinal extension of said tube in a direction from its stowage end portion toward its closed end in a manner such that said tube is pulled endwise from said fixed tube store through said constricting means; and
    pressurizing means communicating to the interior of said closed tube end portion adjacent said closed end thereof for introducing a fluid under pressure into said closed end portion simultaneously with extension of said tube in a direction away from fixed tube store relative to said constricting means to inflate said closed end portion into a relatively rigid tubular configuration as said closed end portion of said tube traverses and its laterally compressed walls react against said constricting means.

2. A deployment mechanism according to claim 1, including:
    a generally tubular guide mounting said constricting means and containing said closed tube end portion for guiding the latter tube end portion in its longitudinal deployment movement.

3. A deployment mechanism according to claim 2, including:
    deployable means supported on said guide for movement therealong, and means connecting said closed tube end to said deployable means for deployment movement of said deployable means along said guide by longitudinal deployment of said tube through said guide.

4. A deployment mechanism according to claim 1, wherein:
    said pressurizing means includes a source of pressurizing fluid and means for selectively communicating said source to said closed tube end portion; and
    means supporting said pressurizing means for deployment movement with said closed tube end portion.

5. A deployment mechanism comprising:
    a long relatively thin-walled flexible tube closed at one end and having a generally uniform cross-section throughout substantially its entire length;
    relatively fixed constricting means engaging and laterally compressing said tube locally for creating a restriction in said tube wherein opposing wall portions of said tube are disposed in substantially fluid sealing relation so as to inhibit fluid flow through the central tube passage from one side of the restriction to the other, said tube having a closed end portion extending from one side of said constricting means and an opposite stowage end portion which is stored in a minimum volume configuration within a relatively fixed tube stowage region at the other side of said constricting means so as to provide a relatively positionally fixed tube store within said region;
    said tube being movable longitudinally through said constricting means in a direction from its stowage end portion toward its closed end portion;
    pressurizing means communicating to the interior of said closed tube end portion adjacent said closed tube end thereof for introducing a fluid under pressure into said closed tube end portion to inflate the latter tube end portion; and
    said constricting means having surface means presented generally longitudinally of said tube and toward said closed tube end, whereby inflation of said closed tube end portion expands said latter tube end portion substantially to its full diameter as said closed tube end portion emerges from said constricting means in such a way that the tube wall reacts against said surface means to produce a longitudinal driving force on said tube in said direction for longitudinally deploying said tube in said direction from its stowage end portion toward its closed end relative to said constricting means in a manner such that said tube is pulled endwise from said fixed tube store through said constricting means.

6. A deployment mechanism according to claim 5, wherein:
    said opposite tube stowage end portion is flattened and rolled into a coil so as to permit containment of said opposite tube end portion within a minimum stowage space, and said deployment mechanism comprises means rotatably supporting said coil in a relatively fixed position within said fixed tube stowage region for unwinding of said tube from said coil during deployment of said tube.

7. A deployment mechanism according to claim 6, wherein:
said tube coil supporting means comprises a reel on which said stowage tube end portion is wound, and means supporting said reel for rotation.

8. A deployment mechanism according to claim 5, wherein:
said constricting means comprise a pair of rollers straddling said tube with their axes extending transversely of said tube and means supporting said rollers in constricting engagement with said tube in such manner as to resist separation of said rollers by deployment fluid pressure in said closed tube end portion.

9. A deployment mechanism according to claim 5, wherein:
said stowage tube end portion is flattened and rolled into a coil which constitutes said minimum volume configuration of said stowage tube end portion, and said closed tube end portion emerges tangentially from said coil; and
said constricting means comprise a member extending centrally through and rotatably supporting said coil, a constricting member engaging the side of said tube opposite said coil in the region wherein said tube emerges tangentially from said coil, and means yieldably urging said members toward one another in such manner that said tube is compressed between said coil and said constricting member as said tube unwinds from said coil during deployment of said closed tube end portion.

10. A deployment mechanism according to claim 9, wherein:
said members comprise rollers having their axes extending transversely of said tube; and
said urging means comprise spring means connected between said rollers for yieldably urging said rollers toward one another.

11. A deployment mechanism comprising:
a long relatively thin-walled flexible tube closed at one end and having a generally uniform cross-section throughout substantially its entire length;
relatively fixed constricting means engaging and laterally compresing said tube locally for creating a restriction in said tube wherein opposing wall portions of said tube are disposed in substantially fluid sealing relation so as to inhibit fluid flow through the central tube passage from one side of the restriction to the other, said tube having a closed end portion at one side of said restriction and an opposite stowage end portion at the other side of said restriction which is stored in a minimum volume configuration within a relatively fixed tube stowage region at the latter side of said restriction so as to provide a relatively positionally fixed tube store within said region;
a supporting structure mounting said constriction means;
said tube being movable longitudinally through said constricting means in a direction from the stowage end portion toward the closed end of said tube;
pressurizing means communicating to the interior of said closed tube end portion adjacent the closed end of said tube for selectively internally pressurizing and thereby inflating said closed tube end portion;
said constricting means having surface means presented generally longitudinally of said tube toward said closed tube end, whereby inflation of said closed tube end portion causes the latter tube end portion to expand to substantially its full diameter as said closed tube end portion emerges from said constricting means in such manner that the tube wall reacts against said surface means to produce a longitudinal driving force on said tube in said direction from said stowage tube end portion toward said closed tube end for moving said tube longitudinally in said direction from its stowage end portion towards its closed end relative to said supporting structure in a manner such that said tube is deployed endwise from said fixed tube store through said constricting means;
a tubular guide secured at one end to said supporting structure and containing said closed tube end portion for guiding the latter tube end portion in its longitudinal deployment movement;
deployable means supported on said guide for movement along said guide; and
means operatively connecting said deployable means to the closed end of said tube for outward deployment of said deployable means along said guide by extension movement of said closed tube end portion through said guide.

12. A deployment mechanism according to claim 11, wherein:
said deployable means comprise a number of articulated solar panels which are deployed by extension of said closed tube end portion from a retracted position of stowage wherein said panels are folded into face-to-face relation flat against said supporting structure and an extended positon of operation wherein said panels are disposed in edge-to-edge substantially in a common plane parallel to said guide.

13. A deployment mechanism comprising:
a long relatively thin-walled flexible tube of generally uniform cross-section throughout substantially its entire length, said tube being closed at one end and having an opposite stowage end portion;
said stowage end portion of said tube being normally flattened and rolled into a coil with the closed end portion of said tube extending generally tangentially from the outer turn of said coil;
means rotatably supporting said coil in a relatively fixed position;
means for deploying said tube longitudinally from said coil in a direction away from said coil and toward said closed tube end in such a way that said tube unwinds from said coil during said deployment and for simultaneously inflating said closed tube end portion as the latter emerges from said coil; and
means for coating the inflated end of said tube as the latter emerges from said coil with a coating composition which hardens to provide the inflated deployed closed end portion of said tube with increased lateral stiffness.

14. A deployment mechanism according to claim 13, wherein:
said coating composition is a thermo-setting resin; and
means for heating said resin after application to said tube to harden said resin.

15. A solar energy conversion system of a space vehicle comprising:
a plurality of panels having solar cells thereon, said panels being in folded arrangement for minimum storage during launching of the space vehicle but being connected so as to be deployed to a position where all panels are co-planar,
a hollow tube which is flexible so as to expand into an expanded configuration or be compressed into a flattened configuration,
one end of said tube being connected to one of the folded panels so that upon extension of said tube said panels unfold to their co-planar deployed position, the other end of said tube being located in a storage area in its flattened configuration,
said hollow tube extending through said restrictive means,
said restrictive means tending to compress said tube into its flattened configuration and located between said one end of said tube and said storage area, and means for forcing said tube to its expanded configuration on the side of said restrictive means adjacent said one end of said tube in opposition to the compressive force of said restrictive means so that the force for expanding said tube pulls said tube through said restrictive means and deploys said panels to their co-planar configuration.

16. The solar energy conversion system claimed in claim 15 wherein said restrictive means comprises rollers located adjacent said space vehicle.

17. The solar energy conversion system claimed in claim 16 wherein one of said rollers is formed of said tube in its flattened configuration.

18. A deployable solar array comprising:
a spacecraft;
a number of articulated solar panels hinged edge-to-edge including an inner end panel and an outer end panel;
means pivotally connecting the inner edge of said inner end panel to said spacecraft;
said panels being deployable relative to said spacecraft from a retracted position of stowage wherein said panels are folded into face-to-face relation against one side of said spacecraft and an extended position of operation wherein said panels are disposed edge-to-edge substantially in a comman plane; and
a deployment mechanism for deploying said panels from said retracted position to said extended position including a relatively than-walled flexible tube closed at one end and having a generally uniform cross-section throughout substantially its entire length, constricting means mounted on said spacecraft and engaging and laterally compressing said tube locally for creating a restriction in said tube wherein opposing wall portions of said tube are disposed in substantially fluid sealing relation so as to inhibit fluid flow through the central tube passage from one side of the restriction to the other, said tube having a closed end portion extending from one side of said constricting means and an opposite stowage end portion extending from the other side of said constricting means which is stored in a minimum volume configuration within a relatively fixed tube stowage region within said spacecraft so as to provide a relatively fixed tube store within said region, said tube being movable longitudinally through said constricting means in a direction from said stowage tube end portion toward said closed tube end, pressurizing means communicating to the interior of said closed tube end portion adjacent said closed tube end for selectively internally pressurizing and thereby inflating said closed tube end portion, said constricting means having surface means presented longitudinally of said tube toward said closed tube end, whereby inflation of said closed tube end portion causes the latter tube end portion to expand to substantially its full diameter as it emerges from said constricting means in such a way that the tube wall reacts against said surface means to produce a longitudinal driving force on said tube in said longitudinal direction thereof for extending said tube in said longitudinal direction away from its storage end portion and toward its closed end relative to said constricting means, means mounting said constricting means on said spacecraft for longitudinal extension of said tube from said spacecraft in said plane and along a direction line normal to the hinging axes of said panels, and means operatively connecting said panels to the closed tube end for deployment of said panels by extension of said tube.

19. A solid array according to claim 18, wherein:
said stowage end portion of said tube is flattened and wound into a coil to permit containment of said coiled tube end within said stowage region, and means rotatably supporting said tube coil in a relatively fixed position within said stowage region for unwinding of said tube from said coil during extension of said tube.

References Cited

UNITED STATES PATENTS

| 1,263,798 | 4/1918 | Otto | 242—86.1 X |
| 2,045,966 | 6/1936 | Ruehmann | 242—86.1 |
| 2,212,128 | 8/1940 | Richter | 46—44 X |
| 3,231,006 | 1/1966 | Fisher et al. | 160—41 |
| 3,326,497 | 6/1967 | Michelson | 244—155 |

FOREIGN PATENTS

| 586,410 | 11/1959 | Canada. |
| 703,614 | 3/1941 | Germany. |

ALLEN B. CURTIS, Primary Examiner

U.S. Cl. X.R.

136—89; 160—188; 242—86; 254—93